United States Patent
Howard et al.

(10) Patent No.: US 7,632,337 B2
(45) Date of Patent: Dec. 15, 2009

(54) AIR PREPURIFICATION FOR CRYOGENIC AIR SEPARATION

(75) Inventors: Henry Edward Howard, Grand Island, NY (US); Jeffert John Nowobilski, Orchard Park, NY (US)

(73) Assignee: Praxair Technology, Inc., Danbury, CT (US)

( * ) Notice: Subject to any disclaimer, the term of this patent is extended or adjusted under 35 U.S.C. 154(b) by 580 days.

(21) Appl. No.: 11/479,565

(22) Filed: Jun. 30, 2006

(65) Prior Publication Data
US 2008/0000352 A1      Jan. 3, 2008

(51) Int. Cl.
*B01D 53/02*      (2006.01)

(52) U.S. Cl. ............... 95/41; 95/96; 95/148; 96/130; 62/643; 62/644; 62/646

(58) Field of Classification Search ......... 95/96, 95/39, 41, 148; 96/121, 130; 62/643, 644, 62/646
See application file for complete search history.

(56) References Cited

U.S. PATENT DOCUMENTS

| | | | |
|---|---|---|---|
| 4,746,343 A * | 5/1988 | Ishizu et al. | 62/646 |
| 4,964,901 A | 10/1990 | Rhode | |
| 5,571,309 A | 11/1996 | Kumar | |
| 5,661,987 A | 9/1997 | Zarate | |
| 5,946,942 A * | 9/1999 | Wong et al. | 62/643 |
| 6,536,234 B1 | 3/2003 | Shah | |

* cited by examiner

*Primary Examiner*—Robert A Hopkins
(74) *Attorney, Agent, or Firm*—Salvatore P. Pace

(57) ABSTRACT

The present invention relates to cryogenic air separation processes and systems that employ a pressure swing adsorption (PSA) prepurification process. It is advantageous to operate the PSA process at a pressure comparable to or below the operating pressure of the highest pressure column in the cryogenic separation unit. Following PSA prepurification, the air can be split into at least two fractions, with at least a portion of the air being directed to the cryogenic separation unit and at least a portion of the remaining air being further pressurized in at least one stage of compression.

62 Claims, 2 Drawing Sheets

AIR PREPURIFICATION FOR CRYOGENIC AIR SEPARATION

TECHNICAL FIELD

The present invention generally relates to cryogenic air separation processes and systems. The present invention more particularly relates to cryogenic air separation processes and systems that employ a pressure swing adsorption (PSA) prepurification process.

BACKGROUND OF THE INVENTION

Cryogenic distillation of air is the predominant source for the production of oxygen ($O_2$) and nitrogen ($N_2$). Prior to distillation, ambient air must be purified to remove or reduce high boiling contaminants. For example, high boiling contaminants such as $H_2O$ and $CO_2$ must be removed to certain levels (e.g., the ppm level or below) in order to ensure continuous operation of the distillation unit. Failure to remove high boiling contaminants to acceptable levels prior to the air being fed to the distillation column(s) can result in freezeout in the cryogenic equipment and/or concentration of hydrocarbons and/or $N_2O$ in oxygen-rich streams.

Air prepurification for cryogenic distillation of air typically employs one of two general classes of adsorption systems: temperature swing adsorption (TSA) systems and pressure swing adsorption (PSA) systems. For both PSA and TSA prepurification systems, the adsorption cycle usually has at least two stages of operation. In one stage, contaminants (such as $H_2O$, $CO_2$, $C_2H_2$, $N_2O$) are adsorbed. In another stage, the contaminant laden bed is regenerated/purged of the adsorbed contaminants. In TSA systems, adsorption will typically occur near ambient temperature (e.g., 40-50° F.) and regeneration will usually take place at high temperature (e.g., 400-500° F.).

In PSA-based prepurification systems, contaminant removal (such as $H_2O$, $CO_2$, $C_2H_2$, $N_2O$) usually takes place at relatively constant temperature (e.g., 50-90° F.). The adsorbent is regenerated by pressure reduction and purge with clean waste gas.

When considering air prepurification alone (i.e., excluding considerations concerning the distillation process), there is a natural motivation to increase operating pressure. Increased air pressure enables a substantial reduction in water content through simple cooling and direct phase separation. Consequently, the quantities of adsorbent and vessel volume can be reduced. This can translate into economical benefits associated with equipment construction and transportation.

In systems employing PSA prepurification, there often exists the need to provide minor/auxiliary streams of air to the air distillation process. Such streams can be effectively employed for the reduction of power consumption during times of high power cost. Alternatively, such streams can be used to adjust product mix or pressure. Unfortunately, extraction of such streams from PSA prepurification systems designed for the highest common air pressure have not provided such streams without undue added complexity and cost.

U.S. Pat. No. 4,964,901 to Rhode relates to a process in which two air streams are prepurified and directed to a cryogenic air separation process. The process employs a high and low pressure column. The process further relates to low purity $O_2$ generation and the use of lower pressure purification for generating a feed that is directed to the lower pressure column.

U.S. Pat. No. 5,661,987 to Zarate discloses a three bed PSA unit for use in conjunction with a cryogenic air separation process. The process shown depicts the PSA unit after the main air compressor. The entire prepurified air stream is then directed to the cryogenic distillation unit.

U.S. Pat. No. 5,571,309 to Kumar relates to the use of a prepurification system for application with a cryogenic air separation unit (ASU) in which the PSA system serves to prepurify two air streams of different pressure.

U.S. Pat. No. 6,536,234 B1 to Shah depicts a three column (pressure) system with two air feed streams of differing pressure.

In the context of PSA air prepurification systems for cryogenic air separation, it would be desirable to provide a PSA prepurification system configured to operate at a pressure near or below that which exists in the highest pressure column or the highest common air pressure of the cryogenic separation unit. It would further be desirable to provide an integrated process which seeks to reduce overall cost associated with respect to air separation processes employing PSA prepurification.

SUMMARY OF THE INVENTION

The present invention generally relates to cryogenic air separation processes and systems and more particularly, to cryogenic air separation processes and systems that employ pressure swing adsorption (PSA) prepurification processes. The PSA prepurification processes can be advantageously operated at pressures comparable to (i.e., within 5-10 psi) or below the operating pressure of the highest pressure column or the highest common air pressure of the cryogenic separation unit. This can be advantageous as is it sometimes preferred to have a feed air stream that is of a lower pressure rather than higher pressure relative to the pressure column in order to reduce power requirements. The pressure range of the prepurification system will typically be about 40-70 psia.

In a particularly advantageous and preferred embodiment of the present invention, the PSA prepurification system is operated at pressures comparable to (i.e., within 5-10 psi) or below the operating pressure of the highest pressure column or the highest common air pressure of the cryogenic separation unit. After the air has passed through the PSA prepurification system, the air is divided into at least two streams. A first portion of the air is directed to a cryogenic separation unit for cryogenic separation of the prepurified air. At least a portion of the remaining air is further subjected to at least one stage of compression for subsequent use in the cryogenic separation unit. In a particularly advantageous embodiment, subsequent air compression is incorporated into a common main air compressor.

More specifically, in a preferred embodiment of the present invention, the prepurified air from the PSA unit is split into at least two fractions. The first fraction is directed to the cryogenic separation unit at a pressure near or below the pressure of the highest common pressure or highest pressure column in the cryogenic separation unit. The second fraction is further compressed and directed to the cryogenic separation unit at a pressure at or above the pressure existing at the highest common pressure or the highest pressure column of the cryogenic separation unit.

One technical advantage of the present invention relative to past approaches is that alternative air separation processes are enabled by lower pressure PSA prepurification processes. For example, the ability to pass lower/moderate pressure air into the cryogenic separation process facilitates liquid production flexibility and can enable a substantial reduction in plant power consumption.

The use of a PSA unit in accordance with the present invention is expected to substantially change the economic tradeoffs normally associated with TSA based prepurification units. There have previously been numerous economic considerations which result in TSA system preference toward higher pressures. These considerations are expected to be reduced or not to exist through the use of PSA-based prepurification systems in accordance with the present invention.

For example, TSA dehydration systems normally employ a mechanical chiller for purposes of reducing water content and increasing adsorbent capacity. When a chiller is used, there is a direct thermodynamic/power penalty associated with lower pressure operation (increased water content at lower pressure substantially increases chiller duty). In contrast thereto, PSA-based dehydration systems generally do not require a chiller and consequently, this penalty can be eliminated.

An added consideration which disfavors the use of TSA systems at lower pressure involves regeneration heating demands. As pressure is reduced, water loading and bed size increase. The associated TSA heater (which is larger) consumes increasing amounts of power to supply both desorption energy and heat required for adsorbent/vessel heating. Because the PSA systems do not rely upon thermal regeneration, this economic penalty does not exist with PSA systems operated at lower pressures.

Relative to TSA-based systems, PSA-based prepurifier systems typically exhibit a larger bed volume per unit of air flow processed; but, the size difference in some cases is only about 38% and does not outweigh the savings in the other areas. This is a consequence of the vastly faster cycle time, which is typically 8 hours for a TSA-based system compared to 12 to 30 minutes for a PSA-based system. As a result, the relative cost increase associated with reduced pressure operation can be less for PSA-based systems relative to TSA-based systems.

These factors taken together allow PSA-based prepurification systems to operate at lower pressures with more favorable economics relative to TSA-based prepurification systems. The integration of PSA prepurification systems in accordance with the present invention at a lower pressure stage of the air compression train is expected to be advantageous over prior art systems.

The present invention accordingly provides for the advantageous implementation of a PSA prepurification system at a pressure comparable to (i.e., within 5-10 psi) or below that which exists in the highest pressure column of the cryogenic separation unit. Such pressure range of the prepurification system will typically be about 40-70 psia. The present invention further provides for the use of additional or booster air compression after air has passed through the PSA prepurification unit.

While not to be construed as limiting, a computer-simulated evaluation associated with a typical liquid $O_2$ pumped lower column air expansion plant have indicated that the addition of an auxiliary lower pressure air feed can effectively reduce plant power consumption by ~3%.

BRIEF DESCRIPTION OF THE DRAWINGS

For a more complete understanding of the present invention and the advantages thereof, reference should be made to the following Detailed Description taken in conjunction with the accompanying drawings in which.

DETAILED DESCRIPTION

As discussed hereinabove, the present invention relates to cryogenic air separation processes and systems that employ pressure swing adsorption (PSA) processes in which the PSA unit can be advantageously operated at a pressure comparable to (i.e., within 5-10 psi) or below the operating pressure of the highest common pressure or the highest pressure column in the cryogenic separation unit. The pressure range of the prepurification system will typically be about 40-70 psia.

Figure 1:
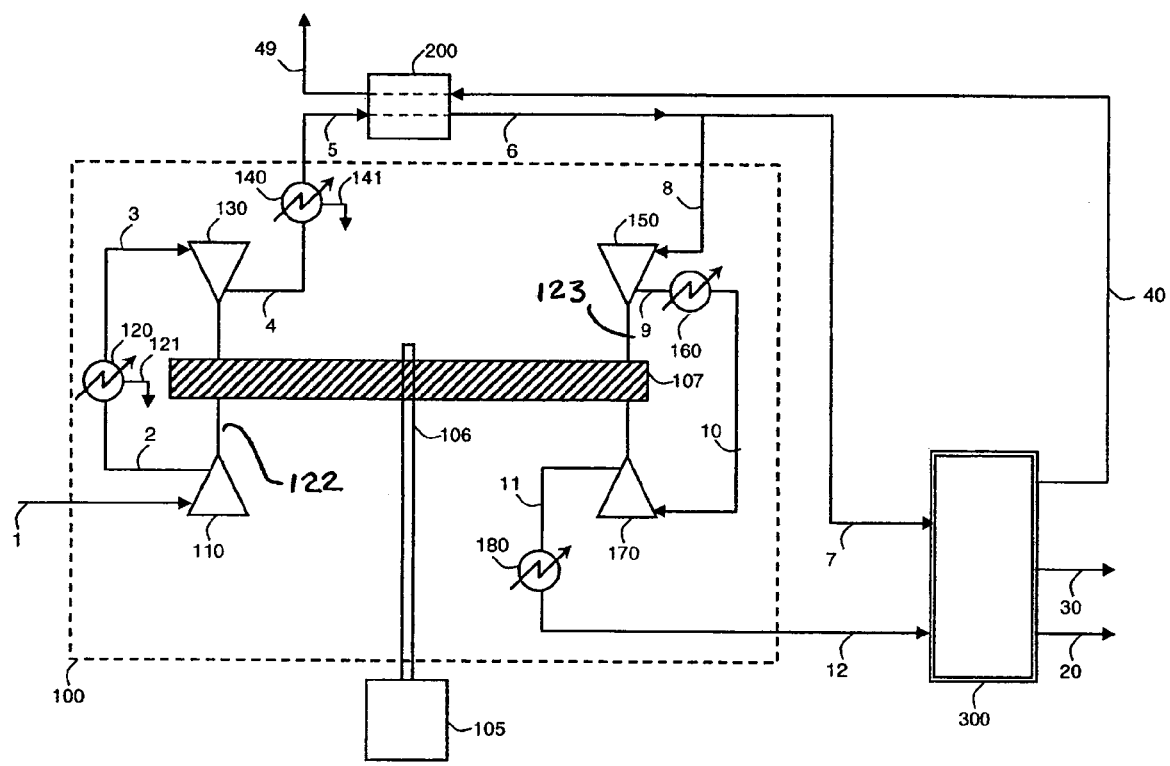
FIG. 1 illustrates an exemplary PSA-based prepurification system suitable for use in accordance with the present invention.

Referring now to FIG. 1, a feed air stream 1 is first fed to a multi-stage compressor 100. As will be described hereinbelow and as shown in FIG. 1, compressor 100 includes multiple stages of intercooled compression. As used herein, "intercooled compression" means that a gas is subjected to cooling following at least one stage of compression. In the embodiment shown in FIG. 1 for example, a four-stage integral gear compressor unit is shown. As further shown in FIG. 1, each of pair of compressor stages (110/130, 150/170) is connected to a pinion 122, 123 respectively, which in turn is driven by bull gear 107, which is in turn driven by shaft 106 and drive 105 (e.g. electric motor).

The embodiment illustrated in FIG. 1 thus provides for air compression utilizing a first stage of baseload air compression 110 and second stage of baseload compression 130. The compression can be intercooled with heat exchangers 120 and 140 following first and/or second stages of compression, respectively. In some embodiments, it may be desirable or necessary to subject the air only to one heat exchanger 120 or 140 prior to entering PSA prepurification unit 200. In some embodiments, it may only be necessary or desirable to subject the air to one stage of compression and cooling prior to introduction into the PSA unit 200.

Likewise, the embodiment illustrated in FIG. 1 further provides for booster air compression utilizing first booster air compression stage 150 and second booster air compression stage 170. The compression can be intercooled with heat exchangers 160 and 180 following first and/or second stages of booster compression, respectively. In some embodiments, it may be desirable or necessary to subject the prepurified air only to one heat exchanger 160 or 180. In some embodiments, it may only be necessary or desirable to subject the prepurified air to one stage of booster compression and cooling prior to introduction into the cryogenic separation unit 300.

Within compressor 100, ambient air stream 1 is first compressed by first baseload air compressor stage 110 and exits as stream 2 (typically at a pressure of about 25-30 psia). As shown in FIG. 1, stream 2 can be cooled within heat exchanger/separation unit 120. Heat exchanger 120 cools the air stream back to near ambient.

In operation, a small condensate ($H_2O$) stream 121 may be produced from heat exchanger 120. Stream 121 can be fed or taken to a suitable sewer/treatment unit for discharge. In alternative embodiments, condensate stream 121 may result from a separate phase separator (not shown).

Compressed and cooled air stream 3 from heat exchanger 120 can be further compressed by way of second baseload air compressor stage 130 to a pressure between about 40-70 psia. Stream 4 can be further cooled by exchanger 140 with the production of condensate stream 141, which can be disposed of in a manner consistent with condensate stream 121.

Cooled compressed stream 5 is then directed to PSA prepurification unit 200 such that high boiling contaminants (e.g., $H_2O$ and $CO_2$) can be removed or sufficiently reduced to acceptable levels. PSA unit 200 is described in greater detail hereinbelow with reference to FIG. 2.

Prepurified air stream 6 is then split into at least two fractions. A first fraction 7 of stream 6 is directed to cryogenic separation unit or coldbox 300, as a moderate/lower pressure feed stream. For example and while not to be construed as limiting, it is expected that stream 7 may be fed to cryogenic separation unit 300 (e.g., coldbox) typically within a pressure range of about 35-65 psia.

Stream 7 will be fed to cryogenic separation unit 300 at a pressure comparable to (i.e., within 5-10 psi) or below the operating pressure of a highest common air pressure in the cryogenic separation unit. In some embodiments for example, distillation columns typically have a highest common air pressure of about 70 psia or above. Accordingly, stream 7 being fed to cryogenic separation unit 300 is comparable to or below the highest common air pressure.

A second fraction 8 of stream 6 is directed back to compressor unit 100. Stream 8 enters first booster air compressor stage 150 where the prepurified air is further compressed to a pressure in the range of about 75-140 psia and exits as stream 9.

Stream 9 can be further cooled by exchanger 160. Stream 10 exits exchanger 160 and can be further compressed by second booster air compressor stage 170 to a pressure in the range of about 130-300 psia. Stream 11 exits stage 170 and is preferably further cooled by exchanger 180 to produce stream 12. As further shown in FIG. 1, stream 12 is then directed to cryogenic separation unit 300 (e.g., coldbox).

Cryogenic separation unit 300 contains at least one phase separating device. The at least one phase separating device can include at least one distillation column, at least one phase separator and/or at least one combined heat and mass transfer device. Cryogenic separation unit 300 often also includes heat exchangers and/or other cryogenic equipment. In some embodiments, cryogenic separation unit 300 may be formed from a grouping of coldboxes with each coldbox containing cryogenic equipment. Once assembled as a group, the coldboxes collectively will have at least one phase separating device. In preferred embodiments, the cryogenic separation unit 300 will include processes related to, but not limited to, the contemporary column such as found for example in Timmerhaus, Klaus D. and Flynn, Thomas M., "Cryogenic Process Engineering", Plenum Press, pages 347-351 (1989).

Cryogenic separation unit (for example, coldbox) 300 may include any number of processes for the distillation of air into its respective components. In general, air is separated into at least $N_2$ and more likely into at least $O_2$ and $N_2$ product streams of varying purities. The cryogenic separation unit or coldbox process(es) may include at least one primary heat exchanger to cool feed gas streams 7 and 12 to be near their respective dew points. While not to be construed as limiting, the distillation unit in cryogenic separation unit or coldbox 300 is expected to typically include between 1 and 3 columns. In the example shown, air streams 7 and 12 are separated into a product $O_2$ stream 20 (which may be of high or low purity) and a product $N_2$ stream 30 (which will typically contain between about 1.0 mol % $O_2$ down to about 1 ppm $O_2$).

As further shown in FIG. 1, a waste $N_2$ stream 40 may be extracted at low pressure and may then be used as a regenerative sweep gas for the purposes of regenerating adsorption system 200 as will be described below.

Figure 2:
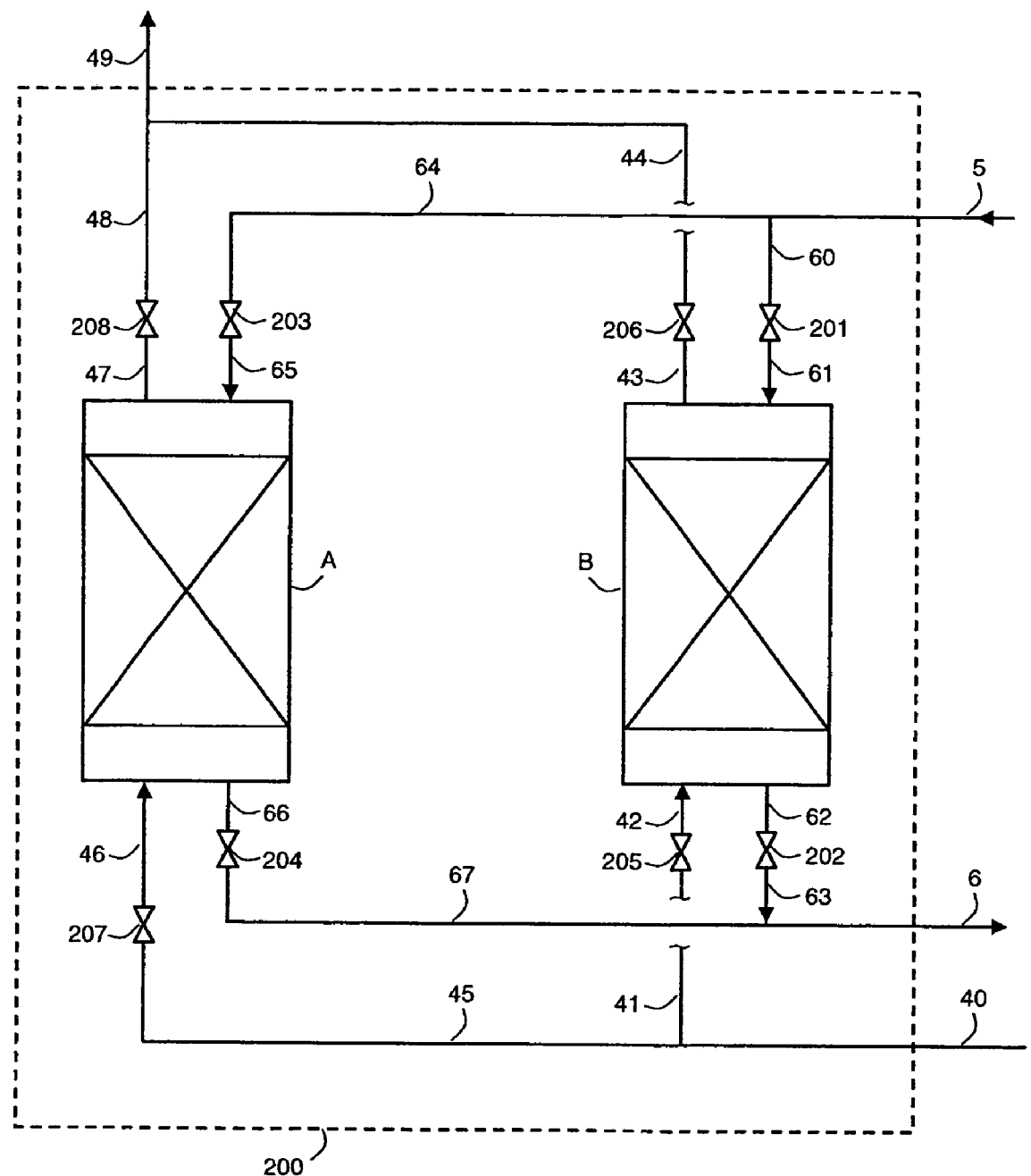
FIG. 2 illustrates a two-bed adsorption PSA system for use in accordance with the present invention.

Referring now to FIG. 2, a two-bed adsorption (PSA) system 200 is illustrated. PSA-based system 200 shown in FIG. 2 includes two parallel adsorbent beds A and B. Beds A and B include an outer vessel and a packed bed of adsorbent. Beds A and B may also employ structures for adsorbent bed support, flow distribution or a medium for affecting equal distribution of gas flow across the bed and support of the bed (e.g. ceramic balls and the like). It will be appreciated that system 200 can be modified to utilize one vessel or more than two vessels and such modifications are suitable for use in accordance with the present invention.

Compressed air (feed gas) stream 5 may be directed to either bed via lines 60 (for bed B) and 64 (for bed A). The transmission of feed air is controlled by way of valves 201 and 203 as well as valves 202 and 204. Feed gas stream 5 is periodically directed through bed A via lines 64, 65, 66 and 67. Likewise, feed gas stream 5 is periodically directed through bed B via streams 60, 61, 62 and 63. Feed air stream lines 63 and 67 can provide a continuous air feed product stream 6 (which is a dry prepurified air stream as previously described).

In similar fashion, cryogenic process(es) 300 produces waste stream 40 which may be directed to beds A and B through lines 41 (for bed B) and 45 (for bed A). The waste (i.e. purge) flow is controlled by valves 205 and 206 as well as valves 207 and 208. Waste stream 40 may be directed through bed A via lines 45, 46, 47 and 48. Likewise, stream 40 may be periodically directed through bed B via lines 41, 42, 43 and 44. A more or less continuous purge gas stream 49 can be created by the junction of lines 44 and 48. This stream may then be directed to atmosphere.

It should be noted that valves 201-208 are preferably automatic valves which may be actuated pneumatically, electrically or otherwise. In some instances, such valves may be accompanied or replaced by check valves to insure proper flow-path through the beds (i.e. to prevent backflow to the process).

For PSA prepurifier systems, there are four general states which can be identified in the adsorption cycle. In a first state, adsorbent beds A or B may be "on-line". While on-line, one bed is adsorbing $H_2O$ and/or other contaminants (e.g. $CO_2$). The "off-line" bed is often said to undergo regeneration. Such regeneration may be completed by way of three distinct steps. It will be appreciated by those skilled in the art that other steps may also be included. These steps or states may include, in order: 1) depressurization (state two), 2) purge (state 3) and 3) re-pressurization (state 4). In order to attain these four states, valves 201-208 are used to manipulate the direction of gas flow through the beds in a periodic fashion in order to create a continuous product air stream.

For example, when bed A is "on-line", valves 203 and 204 are open while 208 and 207 are closed. While bed A is "on-line", bed B undergoes regeneration. In a first step, bed B is depressurized by opening valve 206. During depressurization, valves 201 and 202 are closed. At some point in time, the pressure of bed B is at or below that available within waste stream 40. At this point, purging of the bed is initiated by opening valve 205 (allowing dry waste gas to flow through bed B). After purging, bed B is re-pressurized by the introduction of feed gas air. During repressurizaton, valves 205 and 206 are closed while valve 201 is opened. Once the bed is pressurized to a level comparable to that of bed A, bed B is then ready to go on-line. Bed B may be brought on-line by opening valve 202, thereby resulting in a state analogous to that of bed A.

It is desirable to have a continuous flow of dry prepurified feed air enter the cryogenic process unit 300 and the PSA cycle must accordingly be appropriately configured. In preferred embodiments, the on-line bed is brought to within an acceptable margin of the time required for impurity breakthrough. For example and while not intended to be limiting, an acceptable margin in some cases may be about 1 ppm $CO_2$.

The breakthrough point is defined by the on stream bed time required for the contaminants (e.g. $CO_2/H_2O$) to reach unacceptable levels at the outlet (basically the bed is then saturated with contaminants). The breakthrough time can be determined empirically (observed) or it may be calculated given bed size, impurity content and flow characteristics.

An exemplary PSA cycle will often be about ½ hour. The on-line bed will be in operation for ½ the cycle (or ¼, hour). The total time for regeneration will preferably equal the on-stream time for the on-line bed. A typical time for depressurization is 30 seconds and re-pressurization is about 2 to 5 minutes. The purging portion of the cycle is the difference between ½ the cycle time minus the depressurization and repressurization times (in this instance, ~9.5 to 12.5 minutes).

The invention shown in FIG. 1 depicts an exemplary cryogenic air separation process for use in accordance with the present invention. Various configurations can be employed within the context of the present invention. In addition, the predominant method of air distillation will employ a two pressure level separation as referred to hereinabove with regard to the Timmerhaus et al. reference. A high pressure $N_2$ rectification section serves to reboil the lower pressure column by way of a thermal link (in which $N_2$ condensation duty is imparted to an $O_2$-rich fluid found within a lower portion of the lower pressure column). Such a system can be employed for the recovery of low and high purity $O_2$. In the case of high purity $O_2$, argon may also be recovered by the introduction of a third (lower pressure) column. In general, waste stream 40 will be derived from the $N_2$ rectification section of the lower pressure column.

Within this general context of air distillation, there can be numerous advantageous alternative embodiments. For example, FIG. 1 depicts the division of purified air stream 6 into two streams (7, 8). Three or more column feeds, however, are also possible in accordance with alternative embodiments of the present invention. After division, it may be preferable to compress at least a portion of stream 8 (or another stream) to a pressure substantially in excess of the highest column pressure. Such a stream can then be used to vaporize pumped/pressurized liquid $O_2$ by indirect heat exchange (liquid pumping).

For example, it may be advantageous to compress stream 7 and/or 8 to a pressure substantially in excess of the highest common pressure or the highest pressure column and to cool and expand such a stream. Such embodiments may be turbo-expanded with the production of work. Furthermore, such work can be supplied for compression where the work serves to compress the air that is being expanded. The expanded stream may then be fed into the column system. Moreover, it is possible to extract stream 7 at a pressure between the highest and lowest pressure column and to feed this stream directly into a third intermediary pressure column.

The description of the adsorption system with respect to FIG. 2 is exemplary and is not intended to be limiting. Other adsorption cycles may also be employed. For instance, more than two vessels may be employed for purposes of reducing regeneration gas needs. In yet other alternative embodiments, other regeneration steps may be employed. These options include the use of prepurified air (stream 6) as a regeneration or repressurization gas. Alternatively, there are numerous (dry) streams which could be utilized from the cryogenic process for regeneration of the beds including oxygen-rich streams.

In still other embodiments, purified streams from other processes (other ASUs) may be employed as purge gas.

It should be noted that the valve structure (201-208) for FIG. 1 is simplified in that only valves which directly control process flow path are shown. The use of three-way valves can also be employed within the cycle. For instance, three-way valves may be employed to alternatively direct feed air to the beds or direct waste/purge gas to the atmosphere. Within the process, it is often important that reverse flow be prevented. In particular, check valves can be advantageously positioned to prevent flow from a pressurized bed back into the process through the waste stream. While these check valves are not shown on FIG. 2, those skilled in the art will appreciate that such valves are suitable for use in accordance with the present invention.

The process of FIG. 2 has been described independent of the adsorbent material. Numerous types of adsorbent material can be used. Exemplary adsorbents include, but are not limited to: molecular sieves (i.e., zeolites), activated alumina, silica gel and activated carbon. In some embodiments of PSA dehydration, activated alumina may be a preferred adsorbent material. Combinations of adsorbents can also be used. In particular, the combination of alumina with synthetic zeolites may be particularly advantageous.

The adsorbent material can be deployed within the adsorbent vessel as spherical balls, extruded pellets tablets, granules or monoliths. In some embodiments, it may be advantageous to immobilize the adsorbent material for purposes of increasing gas flow rate.

The invention has been described independent of the shape of the adsorbent beds. It should be noted that conventional systems most often utilize vessels with cylindrical shells. While FIG. 2 illustrates feed air directed downward through the bed, this need not be the case and this flow path can be reversed. In addition, it is possible to design such systems such that the flow path is perpendicular to the axis of the cylindrical vessel (radial inflow/outflow).

The preferred implementation is to place a single prepurification system at the lowest pressure required for the air separation process. The single prepurifier system will minimize the capital cost of the plant. It is also possible, however, to use multiple prepurification systems at each pressure level required. This may be advantageous if only a small gas flow is required at the lower pressure and the large majority of the gas is utilized at a much higher pressure. The capital savings of the smaller size high pressure prepurifier would pay for the second small low pressure system.

It should be appreciated by those skilled in the art that the specific embodiments disclosed above may be readily utilized as a basis for modifying or designing other structures for carrying out the same purposes of the present invention. It should also be realized by those skilled in the art that such equivalent constructions do not depart from the spirit and scope of the invention as set forth in the appended claims.

What is claimed is:

1. A system for air separation, the system comprising:
    a pressure swing adsorption (PSA) prepurification unit comprising at least two vessels, each vessel having at least one adsorption bed;
    a compressor unit configured to provide multiple stages of compression; and
    a cryogenic air separation unit containing at least one phase separating device, the cryogenic air separation unit connected to the PSA unit and the compressor unit;
    wherein the PSA unit is configured to provide at least a first portion of prepurified air from the PSA unit to the cryogenic separation unit and to provide at least a second portion of the prepurified air from the PSA unit to the compressor unit; and
    wherein during operation of the air separation system, the at least first portion of prepurified air from the PSA unit is capable of being directed to the cryogenic air separation unit at pressures below the operating pressure of a highest common air pressure in the cryogenic separation unit.

2. The system of claim 1, wherein the at least one phase separating device comprises at least one distillation column.

3. The system of claim 2, wherein the at least first portion of prepurified air from the PSA unit is configured to be fed to the at least one distillation column.

4. The system of claim 2, wherein the at least one phase separating device comprises at least two distillation columns.

5. The system of claim 4, wherein the at least first portion of prepurified air from the PSA unit is configured to be fed to the at least two distillation columns.

6. The system of claim 2, wherein the at least one phase separating device comprises three distillation columns.

7. The system of claim 6, wherein the at least first portion of prepurified air from the PSA unit is configured to be fed to the three distillation columns.

8. The system of claim 1, wherein the at least one phase separating device comprises at least one phase separator.

9. The system of claim 1, wherein the at least one phase separating device comprises at least one combined heat and mass transfer device.

10. The system of claim 1, wherein at least one of the vessels in the PSA unit includes at least two beds.

11. The system of claim 1, wherein the PSA unit contains two vessels.

12. The system of claim 10, wherein each of the vessels includes at least two beds.

13. The system of claim 1, wherein the compressor unit is configured to provide at least a first stage of baseload air compression prior to the air being directed to the PSA unit and further configured to provide at least a first stage of booster compression to at least the second portion of the prepurified air from the PSA unit.

14. The system of claim 13, wherein the at least one first stage of baseload air compression is configured to compress the air prior to prepurification in the PSA unit to a predetermined pressure range.

15. The system of claim 14, wherein the compressor unit is configured to provide cooling to the compressed air from the at least one first stage of baseload air compression.

16. The system of claim 14, wherein the compressor unit is configured to provide a second stage of baseload air compression following the at least one first stage of baseload air compression.

17. The system of claim 16, wherein the compressor unit is configured to provide cooling to the compressed air following at least one of: the at least one first stage of baseload air compression and the following the second stage of baseload air compression.

18. The system of claim 17, wherein the compressor unit is configured to provide cooling to the compressed air following the at least one first stage of baseload air compression and following the second stage of baseload air compression.

19. The system of claim 13, wherein the at least one first stage of booster air compression is configured to compress the at least second portion of the prepurified air from the PSA unit to a predetermined pressure range.

20. The system of claim 19, wherein the compressor unit is configured to provide cooling to the at least second portion of the prepurified air from the PSA unit following the at least one first stage of booster air compression.

21. The system of claim 19, wherein the compressor unit is configured to provide a second stage of booster air compression following the at least one first stage of booster air compression.

22. The system of claim 21, wherein the compressor unit is configured to provide cooling to the compressed prepurified air following at least one of: the at least one first stage of booster air compression and the following the second stage of booster air compression.

23. The system of claim 22, wherein the compressor unit is configured to provide cooling to the compressed prepurified air following the at least one first stage of booster air compression and following the second stage of booster air compression.

24. The system of claim 1, wherein the cryogenic separation unit is further configured to receive prepurified air from air that has been compressed after prepurification in the PSA unit.

25. The system of claim 1, wherein the cryogenic separation unit is configured to separate the air into at least one stream comprising nitrogen as a major component thereof.

26. The system of claim 25, wherein the cryogenic separation unit is configured to separate air into at least a first stream comprising nitrogen as a major component thereof and a second stream comprising oxygen as a major component thereof.

27. The system of claim 25, wherein the cryogenic separation unit is configured to separate air into at least a first stream comprising nitrogen as a major component thereof, a second stream comprising oxygen as a major component thereof and a third stream suitable for use as purge gas in the PSA unit.

28. The system of claim 27, wherein the third stream comprises nitrogen.

29. The system of claim 1, wherein the system is configured such that the at least first portion of prepurified air can be expanded prior to or within the cryogenic separation unit.

30. The system of claim 29, wherein the system is configured such that the expansion is within the cryogenic separation unit.

31. The system of claim 1, wherein the system is configured such that the at least second portion of prepurified air can be expanded prior to or within the cryogenic separation unit.

32. The system of claim 31, wherein the system is configured such that the expansion is within the cryogenic separation unit.

33. A process for air separation, the process comprising:
feeding an air stream to a compressor unit;
compressing the air in at least a first stage of baseload air compression;
cooling the compressed air;
feeding the cooled, compressed air to at least one pressure swing adsorption (PSA) prepurification unit to remove contaminants from the air and provide a prepurified air stream;
dividing the prepurified air stream into at least a first portion of prepurified air and at least a second portion of the prepurified air;
feeding the at least first portion of prepurified air from the PSA unit to a cryogenic air separation unit having at least one phase separating device such that the at least first portion of prepurified air is fed to the cryogenic air separation device at a pressure below the operating pressure of a highest common air pressure in the cryogenic separation unit;
feeding the at least second portion of the prepurified air to the compressor unit;

compressing the at least second portion of the prepurified air in at least a second stage of booster air compression; and feeding the compressed prepurified air to the cryogenic air separation unit.

34. The process of claim 33, wherein the at least one phase separating device comprises at least one distillation column.

35. The process of claim 34, wherein the at least first portion of prepurified air from the PSA unit is fed to the at least one distillation column.

36. The process of claim 34, wherein the at least one phase separating device comprises at least two distillation columns.

37. The process of claim 36, wherein the at least first portion of prepurified air from the PSA unit is fed to the at least two distillation columns.

38. The process of claim 34, wherein the at least one phase separating device comprises three distillation columns.

39. The process of claim 38, wherein the at least first portion of prepurified air from the PSA unit is fed to the three distillation columns.

40. The process of claim 33, wherein the at least one phase separating device comprises at least one phase separator.

41. The process of claim 33, wherein the at least one phase separating device comprises at least one combined heat and mass transfer device.

42. The process of claim 33, wherein the PSA unit contains at least two vessels.

43. The process of claims 42, wherein at least one of the vessels in the PSA unit includes at least two beds.

44. The process of claim 42, wherein the PSA unit contains two vessels.

45. The process of claim 44, wherein each of the vessels includes at least two beds.

46. The process of claim 33, wherein the at least one first stage of baseload air compression compresses the air prior to prepurification in the PSA unit to a predetermined pressure range.

47. The process of claim 46, further comprising compressing the air prior to prepurification in the PSA unit to a second stage of baseload air compression following the at least one first stage of baseload air compression.

48. The process of claim 47, wherein the cooling of the compressed air follows at least one of: the at least one first stage of baseload air compression and the following the second stage of baseload air compression.

49. The process of claim 48, wherein the cooling of the compressed air follows the at least one first stage of baseload air compression and follows the second stage of baseload air compression.

50. The process of claim 33, wherein the at least one first stage of booster air compression compresses the at least second portion of the prepurified air from the PSA unit to a predetermined pressure range.

51. The process of claim 50, wherein cooling of the at least second portion of the prepurified air from the PSA unit follows the at least one first stage of booster air compression.

52. The process of claim 33, wherein the at least second portion of the prepurified air is compressed in a second stage of booster air compression following the at least one first stage of booster air compression.

53. The process of claim 52, wherein cooling to the compressed prepurified air follows at least one of: the at least one first stage of booster air compression and the following the second stage of booster air compression.

54. The process of claim 53, wherein the cooling to the compressed prepurified air follows the at least one first stage of booster air compression and follows the second stage of booster air compression.

55. The process of claim 33, wherein the cryogenic separation unit separates the prepurified air into at least one stream comprising nitrogen as a major component thereof.

56. The process of claim 55, wherein the cryogenic separation unit separates the prepurified air into at least a first stream comprising nitrogen as a major component thereof and a second stream comprising oxygen as a major component thereof.

57. The process of claim 56, wherein the cryogenic separation unit separates the prepurified air into at least a first stream comprising nitrogen as a major component thereof, a second stream comprising oxygen as a major component thereof and a third stream suitable for use as purge gas in the PSA unit.

58. The process of claim 57, wherein the third stream comprises nitrogen.

59. The process of claim 33, further including expanding the at least first portion of prepurified air prior to or within the cryogenic separation unit.

60. The process of claim 59, wherein the expansion is within the cryogenic separation unit.

61. The process of claim 33, further including expanding the at least second portion of prepurified air prior to or within the cryogenic separation unit.

62. The process of claim 61, wherein the expansion is within the cryogenic separation unit.

* * * * *